US009537549B2

(12) United States Patent
Bi et al.

(10) Patent No.: US 9,537,549 B2
(45) Date of Patent: Jan. 3, 2017

(54) METHOD, TERMINAL AND BASE STATION FOR MULTI-USER INTERFERENCE SUPPRESSION

(71) Applicant: Huawei Technologies Co., Ltd., Shenzhen (CN)

(72) Inventors: Xiaoyan Bi, Shanghai (CN); Dageng Chen, Shanghai (CN); Bin Xia, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 236 days.

(21) Appl. No.: 14/476,927

(22) Filed: Sep. 4, 2014

(65) Prior Publication Data

US 2014/0369311 A1    Dec. 18, 2014

Related U.S. Application Data

(63) Continuation of application No. PCT/CN2012/086282, filed on Dec. 10, 2012.

(30) Foreign Application Priority Data

Mar. 6, 2012    (CN) .......................... 2012 1 0057024

(51) Int. Cl.
*H04W 4/00* (2009.01)
*H04J 1/16* (2006.01)
(Continued)

(52) U.S. Cl.
CPC ............ *H04B 7/0452* (2013.01); *H04B 7/024* (2013.01); *H04B 7/0473* (2013.01); *H04L 25/0204* (2013.01)

(58) Field of Classification Search
CPC ..... H04B 7/0452; H04B 7/024; H04B 7/0473; H04B 7/0619; H04B 7/0669; H04B 7/043; H04L 25/0204; H04L 5/0035
See application file for complete search history.

(56) References Cited

U.S. PATENT DOCUMENTS

2008/0232239 A1* 9/2008 Mujtaba ............... H04B 7/0669
                                                                    370/209
2008/0304658 A1* 12/2008 Yuda ....................... H04B 7/043
                                                                     380/44
(Continued)

FOREIGN PATENT DOCUMENTS

CN           101374006 A          2/2009
CN           101841357 A          9/2010
(Continued)

OTHER PUBLICATIONS

Foreign Communication From a Counterpart Application, Chinese Application No. 201210057024.1, Chinese Office Action dated Jul. 3, 2015, 5 pages.

(Continued)

*Primary Examiner* — Kiet Tang
(74) *Attorney, Agent, or Firm* — Conley Rose, P.C.

(57) ABSTRACT

Embodiments of the present invention provide a multi-user interference suppression method, terminal and base station. The method includes performing layer mapping on and precoding service data of each of paired users to obtain precoded output data, mapping the precoded output data and a common pilot sequence to a port of an antenna array for sending to each user by using the antenna array. Correspondingly, the embodiments of the present invention further provide a data receiving method, base station and terminal. By using a common pilot sequence based on the paired users, the same pilot sequence is used for each user in the paired users of a cell or a collaborative area, which is different from the technical solution in the prior art where a (Continued)

user-specific pilot is used and pilots of different users are orthogonal.

10 Claims, 7 Drawing Sheets

(51) Int. Cl.
*H04K 1/10* (2006.01)
*H04L 9/00* (2006.01)
*H04B 7/04* (2006.01)
*H04B 7/02* (2006.01)
*H04L 25/02* (2006.01)

(56) References Cited

U.S. PATENT DOCUMENTS

| | | | |
|---|---|---|---|
| 2010/0215112 A1 | 8/2010 | Tsai et al. | |
| 2010/0303034 A1 | 12/2010 | Chen et al. | |
| 2011/0176442 A1* | 7/2011 | Ihm | H04B 7/0619 370/252 |
| 2011/0194551 A1 | 8/2011 | Lee et al. | |
| 2012/0008577 A1 | 1/2012 | Han et al. | |
| 2014/0112403 A1* | 4/2014 | Falconetti | H04L 5/0035 375/260 |

FOREIGN PATENT DOCUMENTS

| | | |
|---|---|---|
| CN | 102122984 A | 7/2011 |
| CN | 102315912 A | 1/2012 |

OTHER PUBLICATIONS

Partial English Translation and Abstract of Chinese Patent Application No. CN102122984, Nov. 17, 2014, 29 pages.

Partial English Translation and Abstract of Chinese Patent Application No. CN101841357A, Sep. 11, 2014, 54 pages.

Foreign Communication From a Counterpart Application, PCT Application No. PCT/CN2012/086282, English Translation of International Search Report dated Mar. 21, 2013, 2 pages.

Foreign Communication From a Counterpart Application, PCT Application No. PCT/CN2012/086282, English Translation of Written Opinion dated Mar. 21, 2013, 8 pages.

Foreign Communication From a Counterpart Application, European Application No. 12870725.4, Extended European Search Report dated Dec. 16, 2014, 8 pages.

"LTE; Evolved Universal Terrestrial Radio Access (E-UTRA); Physical layer procedures (3GPP TS 36.213 version 10.4.0 Release 10)," ETSIS TS 136 213, Technical Specification, V10.4.0, Jan. 2012, 127 pages.

Busche, H., et al., "SVD-based MIMO Precoding and Equalization Schemes for Realistic Channel Knowledge: Design Criteria and Performance Evaluation," Wireless Pers Commun, Jun. 5, 2008, XP019691083, pp. 347-359.

Wei, L., et al., "An Efficient Joint User and Antenna Selection for MIMO Broadcast Communications Using Generalized Zero Forcing Precoder," IEEE 20th International Symposium on Personal, Indoor and Mobile Radio Communications, Sep. 13-16, 2009, XP031659536, pp. 1312-1316.

* cited by examiner

METHOD, TERMINAL AND BASE STATION FOR MULTI-USER INTERFERENCE SUPPRESSION

CROSS-REFERENCE TO RELATED APPLICATIONS

This application is a continuation of International Application No. PCT/CN2012/086282, filed on Dec. 10, 2012, which claims priority to Chinese Patent Application No. 201210057024.1, filed on Mar. 6, 2012, both of which are hereby incorporated by reference in their entireties.

TECHNICAL FIELD

The present invention relates to the communications field, and in particular, to a data sending method, a data receiving method, a terminal and a base station.

BACKGROUND

Enhancement of a Multiple-Input Multiple-Output (MIMO) technology and Coordinated Multipoint Transmission (CoMP) are important ways to accommodate requirements on increasing peak spectrum efficiency and average spectrum efficiency of a Long Term Evolution Advanced (LTE-A) system. In the current Third Generation Partnership Project (3GPP) Evolved Universal Terrestrial Radio Access Network (E-UTRAN) Release 10 (R10) edition, the enhanced MIMO technology is a spatial multiplexing technology supporting eight layers at most, which may adopt a codebook-based precoding solution or a non-codebook-based precoding solution. With principles of a distributed antenna, CoMP reduces interference by using collaboration of multiple base stations, thereby enhancing data spectrum efficiency. As a key technology of LTE-A, CoMP may effectively increase the average throughput of a system and performance of cell edge users. The Multiple User-Multiple Input Multiple Output (MU-MIMO) technology is adopted in a CoMP system so that multiple User Equipments (UEs) are served simultaneously in a multi-cell collaboration manner, which improves the system average throughput and improves an edge throughput by using inter-cell interference suppression. Therefore, application of the MU-MIMO under the CoMP system is a hot technology at present. Critical issues studied in the MU-MIMO technology under the CoMP system include how to support a demodulation pilot sequence collaboratively transmitted in multiple cells and interference suppression between multiple users.

In an existing MU-MIMO transmission mode based on non-codebook precoding, the base station precodes the service data and the pilot sequence Demodulation Reference Signals (DM-RS) and transmits them. The DM-RS is used in channel estimation of the receiver. At the receiver, channel estimation is performed for the DM-RS to obtain a channel estimation value required for data demodulation, and corresponding data demodulation is performed according to the channel estimation value to obtain the service data.

In the prior art, a user must obtain channel estimation of the equivalent channel by estimating the DM-RS, which requires that the DM-RS s of different layers/users must be orthogonal. In the CoMP system, an existing DM-RS does not support orthogonality between cells. Therefore, the existing DM-RS fails to support the MU-MIMO mode of the CoMP system well. When the existing DM-RS is adopted under the MU-MIMO mode of the CoMP system, channel estimation accuracy of the receiver is relatively poor and interference between multiple users can hardly be eliminated, which results in a low signal to interference plus noise ratio of the received signals.

SUMMARY

Embodiments of the present invention provide a data sending method, a data receiving method, a base station and a terminal where a cell-specific pilot sequence is used to better support the CoMP mode and improve accuracy of channel estimation effectively. Correspondingly, at a receiver, a detection vector is obtained based on channel estimation so as to reduce interference between multiple users, and improve the signal to interference plus noise ratio.

An embodiment of the present invention provides a data sending method including obtaining, according to a channel matrix of each of paired users, a precoding matrix of the paired users, where the paired users are a set of multiple users sharing the same time-frequency resource and receiving and sending data on the same time-frequency resource simultaneously. The method also includes performing layer mapping on service data of the paired users to obtain layered service data, precoding the layered service data by using the precoding matrix to obtain precoded output data, mapping the precoded output data and a common pilot sequence to a port of an antenna array, where the common pilot sequence is the same pilot signal sequence sent by a base station on a specific time-frequency resource to each user in the paired users, and sending the data mapped to the port of the antenna array to each user by using the antenna array.

An embodiment of the present invention provides a data receiving method including receiving, by a user, data sent by a base station, demapping, by the user, the received data to obtain a common pilot sequence and service data containing multi-user interference, where the common pilot sequence is the same pilot signal sequence sent by the base station on a specific time-frequency resource to the user and other users receiving and sending data on the same time-frequency resource as the user, performing, by the user, channel estimation by using the common pilot sequence to obtain a channel matrix between the user and the base station, performing eigenvalue decomposition on the product of the channel matrix and a conjugate transposition of the channel matrix to obtain a detection vector, and demodulating the service data containing multi-user interference by using the detection vector, to obtain service data of the user.

An embodiment of the present invention further provides a base station including a precoding matrix generating module configured to obtain, according to a channel matrix of each of paired users, a precoding matrix of the paired users, where the paired users are a set of multiple users sharing the same time-frequency resource and receiving and sending data on the same time-frequency resource simultaneously, a layer mapping module configured to perform layer mapping on service data of the paired users to obtain layered service data, a precoding module configured to precode the layered service data by using the precoding matrix obtained by the precoding matrix generating module to obtain precoded output data, an antenna mapping module configured to map the precoded output data and a common pilot sequence to a port of an antenna array, where the common pilot sequence is the same pilot signal sequence sent by a base station on a specific time-frequency resource to each user in the paired users, and an antenna array configured to send the data mapped to the port of the antenna array to each user by using the antenna array.

An embodiment of the present invention further provides a terminal including a receiving module configured to receive data sent by a base station, a demapping module configured to demap the received data to obtain a common pilot sequence and service data containing multi-user interference, where the common pilot sequence is the same pilot signal sequence sent by the base station on a specific time-frequency resource to the terminal and other terminals receiving and sending data on the same time-frequency resource as the terminal, a channel estimation module configured to perform channel estimation by using the common pilot sequence to obtain a channel matrix between the terminal and the base station, an eigenvalue decomposition module configured to perform eigenvalue decomposition on the product of the channel matrix and a conjugate transposition of the channel matrix to obtain a detection vector, and a demodulation module configured to demodulate the service data containing multi-user interference by using the detection vector to obtain service data of the user.

In the embodiments of the present invention, by using the foregoing technical solutions having a common pilot sequence based on the paired users, the same pilot sequence is used for each user in the paired users of a cell or a collaborative area, which is different from the technical solution in the prior art where a user-specific DM-RS is used and the DM-RSs of different users must be orthogonal. Therefore, the number of paired users is not limited by the number of orthogonal DM-RSs, thereby better supporting the CoMP mode and improving accuracy of channel estimation.

BRIEF DESCRIPTION OF DRAWINGS

To describe the technical solutions in the embodiments of the present invention or in the prior art more clearly, the following briefly introduces the accompanying drawings required for describing the embodiments or the prior art. The accompanying drawings in the following description show merely some embodiments of the present invention, and persons of ordinary skill in the art may still derive other drawings from the accompanying drawings without creative efforts.

DESCRIPTION OF EMBODIMENTS

The following clearly describes the technical solutions in the embodiments of the present invention with reference to the accompanying drawings in the embodiments of the present invention. The described embodiments are merely a part rather than all of the embodiments of the present invention. All other embodiments obtained by persons of ordinary skill in the art based on the embodiment of the present invention without creative efforts shall fall within the protection scope of the present invention.

Technical solutions of the present invention may be applied to multiple scenarios, for example the MU-MIMO mode of a CoMP system and the MU-MIMO mode of an LTE-A system. For ease of description of the technical solutions of the present invention, a downlink receiving and sending process under the MU-MIMO mode in the CoMP system is used as an example for illustration.

Figure 1:
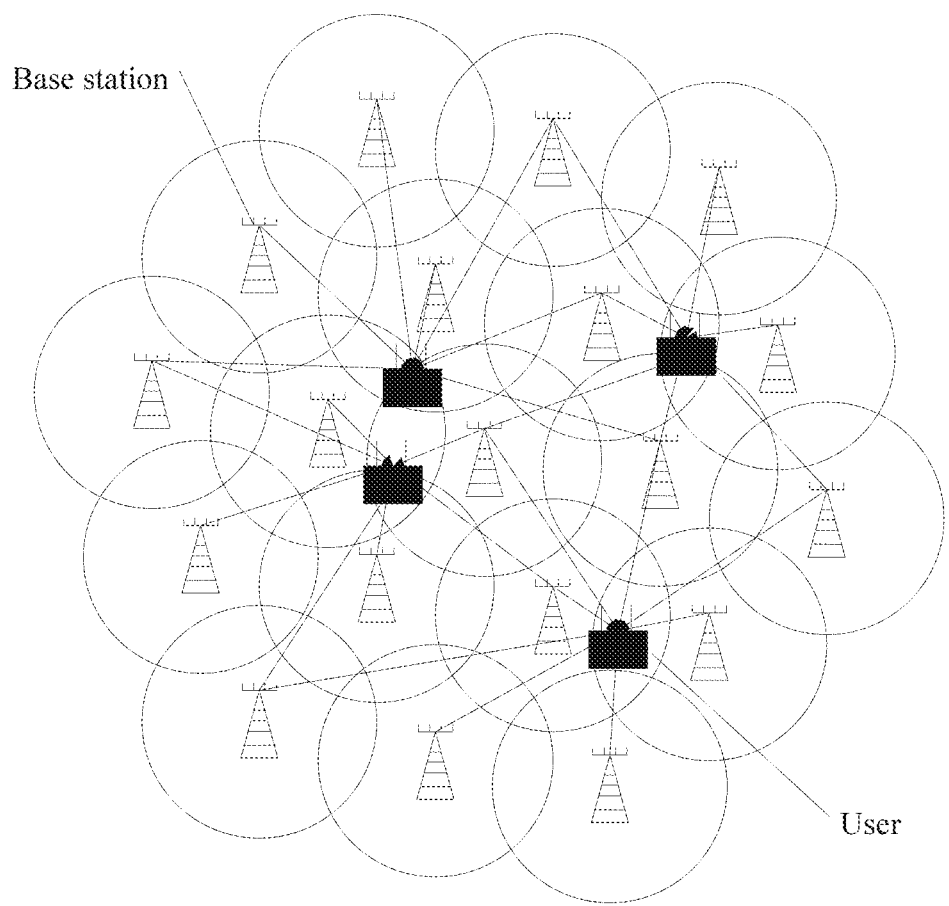
FIG. 1 is a schematic diagram of an MU-MIMO general system model according to an embodiment of the present invention.

FIG. 1 is a schematic diagram of a CoMP system model according to an embodiment of the present invention. As can be known from FIG. 1, multiple base stations simultaneously and collaboratively provide communication services for multiple users (that is, mobile stations) in the CoMP system. Each user can receive data streams of multiple antennas, and at the same time, each user can independently receive different data streams, thereby reaching relatively high throughput. However, each of the data streams may be spatially interfered by other data streams. Other data streams refer to data streams sent to other users, and other data streams sent to the user. In the downlink, the base station sends data to multiple users, thereby causing multi-user interference. Meanwhile, the user may receive data sent by multiple base stations, thereby causing inter-cell interference. In this case, the base station may preprocess the data before sending a signal, to eliminate interference. However, if only information of a receiver is used, interference elimination may face a problem of insufficient coordination information between users, and therefore downlink interference elimination is more difficult than uplink interference elimination.

To help persons of ordinary skill in the art better understand the technical solutions provided in the embodiments of the present invention, an MU-MIMO downlink receiving and sending solution under the transmission mode based on non-codebook precoding in the prior art is described briefly.

Figure 2:
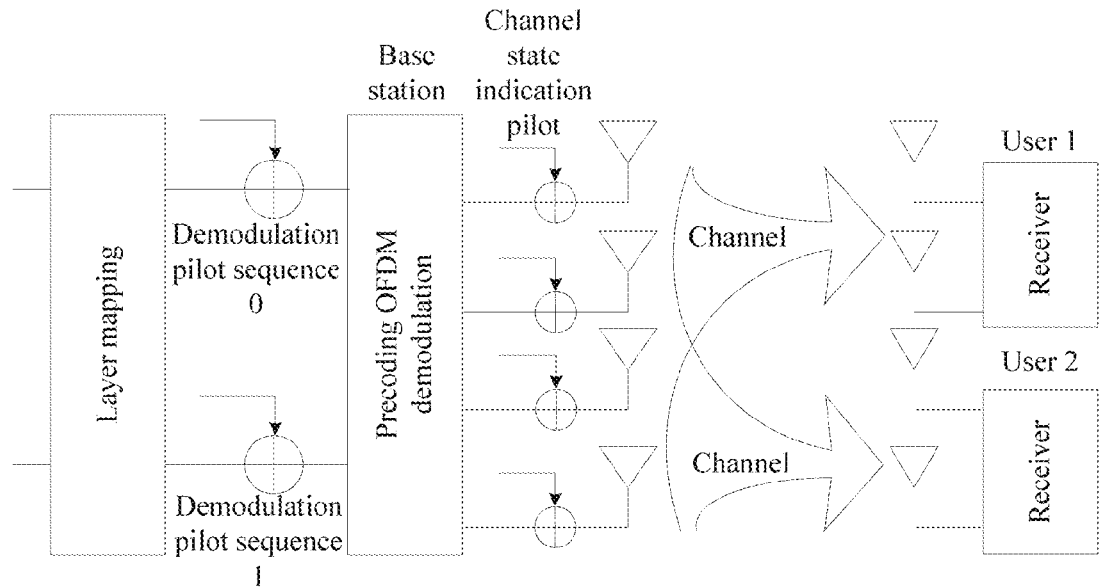
FIG. 2 is a schematic diagram of a receiving and sending solution of an MU-MIMO system based on non-codebook precoding in the prior art.

FIG. 2 is a schematic diagram of a receiving and sending solution of an MU-MIMO system based on non-codebook precoding in an LTE-A system, where two paired users (user 1 and user 2) are used as an example for description. It should be noted that, in the MIMO system, each terminal only has one antenna, the difference between channel conditions of the users is great, and the difference of large-size fading in different antennas is large. By using a specific scheduling mechanism, users meeting a requirement are selected and grouped into one group. Successfully grouped user antennas form a virtual multi-antenna array and are receiving and sending data on the same time/frequency resource. The successfully grouped users are referred to as the paired users.

The implementation steps of the receiving and sending solution of the prior art are as follows.

(1) Transmitter: a base station measures channels $H_1$ and $H_2$ of user 1 and user 2, performs Singular Value Decomposition (SVD) on a channel matrix to obtain matrix $\tilde{V}=[v_1, v_2]$, where $v_i$ (i=1,2) is a first right singular vector (which is usually a right singular vector corresponding to a greatest singular value) obtained after singular value decomposition is performed on the channel matrix $H_i$ (i=1,2). Afterwards, the base station seeks a right pseudo-inverse for $\tilde{V}$ according to a formula $W=\tilde{V}[\tilde{V}^H \tilde{V}]^{-1}$ to obtain a precoding matrix W, where $W=[W_1, W_2]$, $W_i$ (i=1,2) is a precoding vector of a user i, $\tilde{V}^H$ represents conjugate transposition of $\tilde{V}$. In the end, the base station precodes user data (PDSCH) and a DM-RS according to the matrix W for transmitting, where the DM-RS is a pilot sequence and the DM-RSs of different users are orthogonal to each other.

It should be noted that singular value decomposition is performed on a channel matrix H, $H=UDV^H$, where U,V are unitary matrices, and D is a diagonal matrix, and where the element of the diagonal matrix is channel gain of a sub-channel of a MIMO channel.

(2) Receiver: user 1 is taken as an example, and a received signal thereof is represented as:

$$y_1 = H_1 w_1 s_1 + H_1 w_2 s_2 + n_1 = h_1 s_1 + h_2 s_2 + n_1$$

The first item in the foregoing formula is a target signal, and the second item is interference between users. After receiving the DM-RS and PDSCH data, user 1 performs channel estimation on the DM-RS first, to obtain an equivalent channel $w_1 = h_1^H$. The user then uses $w_1$ as a detection vector of a receiver, and demodulation data is obtained after a filter is determined by a data detection vector of user 1.

$$r_1 = w_1 h_1 s_1 + w_1 h_2 s_2 + w_1 n_1$$

It can be seen from the foregoing description that, in the prior art, the DM-RSs of different users must be orthogonal, and therefore, the number of paired users is limited by the number of orthogonal DM-RSs. In a multi-cell joint transmission scenario, the number of orthogonal DM-RSs limits the number of paired users, thereby limiting spatial multiplexing gain.

Figure 3:
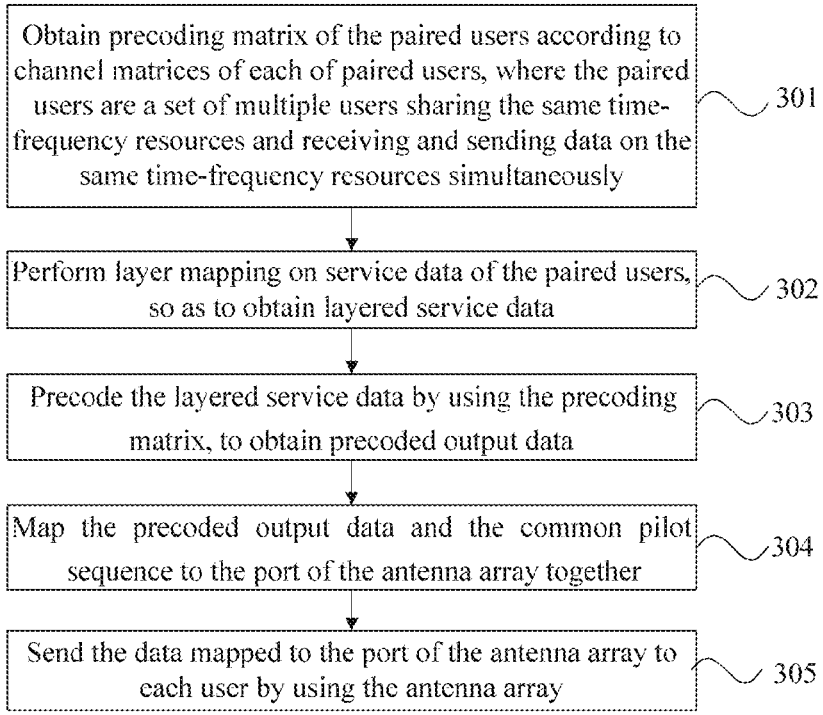
FIG. 3 is a flow chart of a data sending method according to Embodiment 1 of the present invention.

As shown in FIG. 3, Embodiment 1 of the present invention provides a data sending method. The method may be applied to a CoMP system as shown in FIG. 1, or to other communication systems, such as an LTE-A system. The method includes the following steps.

S301: Obtain precoding matrix of the paired users according to a channel matrix of each of the paired users, where the paired users are a set of multiple users sharing the same time-frequency resource and receiving and sending data on the same time-frequency resource simultaneously.

It should be noted that, in the MIMO system, each terminal only has one antenna, the difference between channel conditions of the users is great, and the difference of large-size fading in different antennas is large. By using a specific scheduling mechanism, users meeting a requirement are selected and grouped into one group so that successfully grouped user antennas form a virtual multi-antenna array and are receiving and sending data on the same time/frequency resource. The successfully grouped users are referred to as the paired users.

Specifically, in an embodiment, it is assumed that a channel matrix of a paired user i (i=1,2, ... n) is $H_i$ and singular value decomposition is performed on the channel matrix $H_i$ of each user to obtain singular vectors $v_1, v_2 \ldots v_n$ corresponding to each user, where $v_i$ (i=1,2, ... n) is a first right singular vector (which is usually a right singular vector corresponding to a greatest singular value) obtained after singular value decomposition is performed on a channel matrix $H_i = U_i \Sigma_i V_i^H$. It should be noted that any m×n complex matrix H may be decomposed into a product of three matrices U, $\Sigma$, V, where matrix U is an m×m dimension unitary matrix, V is an n×n dimension unitary matrix, and $\Sigma$ is a diagonal matrix, and an element on its diagonal is a number larger than or equal to 0, and elements in $\Sigma$ are usually sorted in a descending order. A column vector of the matrix U is usually referred to as a left singular vector of H, and a first column of the matrix U is usually referred to as a first left singular vector, and column vectors of the matrix U and the matrix V is usually referred to as the right singular vector of H.

Singular vectors of users are combined, to obtain a matrix $\tilde{V} = [v_1, v_2 \ldots v_n]$, and a right pseudo-inverse is sought according to a formula $W = \tilde{V}[\tilde{V}^H \tilde{V}]^{-1}$, to obtain a precoding matrix W, where $\tilde{V}^H$ represents conjugate transposition of $\tilde{V}$, $W=[W_1, W_2, \ldots W_n]$, and $W_i$ (i=1,2, ... n) is a precoding vector of a user i.

S302: Perform layer mapping on service data of the paired users to obtain layered service data.

It should be noted that according to the definition in the 3GPP standard draft R10, layer mapping is an operation of mapping modulated code words to corresponding layers according to the number of layers allocated by the medium access control (MAC). After the operation of layer mapping, the original serial data stream is divided into multiple layers spatially, and the number of layers is usually smaller than or equal to a rank of channel matrix. In addition, it should be noted that the service data of the paired users specifically refers to data sent to one or multiple users in the paired users.

S303: Precode the layered service data by using the precoding matrix to obtain precoded output data.

In an embodiment, it is assumed that after layer mapping is performed on the service data of the paired users the obtained layered service data is represented as $s=[s_1, s_2 \ldots s_n]$, and the layered service data is precoded to obtain precoded output data, $S=Ws$.

S304: Map the precoded output data and the common pilot sequence to the port of the antenna array together.

It should be noted that in the embodiment of the present invention, the common pilot sequence refers to a pilot sequence sent by a base station on a specific time-frequency resource to the paired users, where the sequences are the same to each user in the paired users and are used for channel estimation when user data is demodulated. This is different from the DM-RS in the technical solution in the prior art where the DM-RS is specified by a UE, that is, one UE has a corresponding DM-RS. The common pilot sequence may use an existing (Channel State Indication Reference Signal) CRS-RS of LTE, or a periodic Zadoff-Chu (ZC) sequence or the like. It should also be noted that the antenna mapping function is mainly completed in S305. According to the definition in the standard, antenna mapping is to map data transmitted in each antenna to an orthogonal frequency-division multiplexing (OFDM) time-frequency grid of the antenna array according to the time-frequency resource configured by the MAC.

S305: Send the data mapped to the port of the antenna array to each user by using the antenna array.

In the embodiment of the present invention, by using the foregoing technical solutions having a common pilot sequence based on the paired users, the same pilot sequence is used for each user in the paired users of a cell or a collaborative area, which is different from the technical solution in the prior art where a user-specific DM-RS is used. The pilots of different layers are required to be orthogonal, thereby better supporting the CoMP mode, and improving accuracy of channel estimation.

Figure 4:
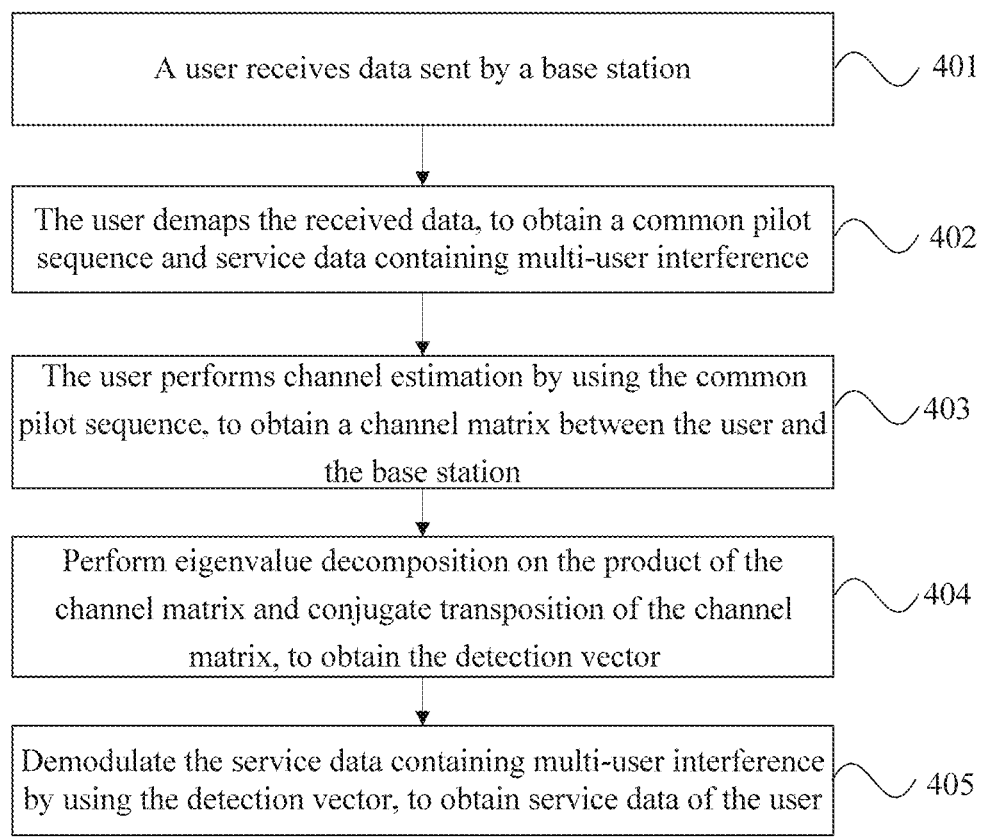
FIG. 4 is a flow chart of a data receiving method according to Embodiment 2 of the present invention.

Correspondingly, as shown in FIG. 4, Embodiment 2 of the present invention provides a data receiving method. The method may be applied to a CoMP system as shown in FIG.

1, or to other communication systems, such as an LTE-A system. The method includes the following steps.

S401: A user receives data sent by a base station.

It should be noted that in the embodiment of the present invention, the user refers to any user in the paired users, where the paired users are a set of multiple users sharing the same time-frequency resource and receiving and sending data on the same time-frequency resource simultaneously.

In addition, it should be noted that in the embodiment of the present invention, data sent by the base station is data after layer mapping and precoding, and layer mapping and precoding belong to the prior art, which is described in detail in Embodiment 1 of the present invention, and is not repeated herein any further.

S402: The user demaps the received data to obtain a common pilot sequence and service data containing multi-user interference, where the common pilot sequence is the same pilot signal sequence sent by the base station on a specific time-frequency resource to the user and other users receiving and sending data on the same time-frequency resource as the user.

Before sending data, the base station performs antenna mapping on the data. Therefore, after receiving baseband data, the user needs to perform demapping, where demapping is an inverse process of antenna mapping. In addition, the data experiences a transmission process of a wireless channel in the CoMP system, and multi-user interference and noise are sure to be caused. Therefore, the received baseband data is demapped, and the obtained service data contains multi-user interference and noise.

It should be noted that in the embodiment of the present invention, the common pilot sequence refers to a pilot sequence sent by a base station on a specific time-frequency resource to the paired users. The sequences are the same to each user in the paired users, and are used for channel estimation when user data is demodulated, which is different from the DM-RS in the technical solution in the prior art where the DM-RS is specified by a UE, that is, one UE has a corresponding DM-RS. The common pilot sequence may use an existing CRS-RS of LTE, or a periodic ZC sequence or the like.

S403: The user performs channel estimation by using the common pilot sequence to obtain a channel matrix between the user and the base station.

Channel estimation may be a process that a model parameter of a channel model in the received data is estimated. Channel state information required by the receiver may be provided by using channel estimation.

After receiving information sent by a base station (BS), the user performs channel estimation according to the information sent by the base station. As described in S402, the data received by the user contains a common pilot sequence based on the paired user. As such, the user may perform estimation on channels between the base station and the user by using some channel estimation algorithms and according to the common pilot sequence to obtain a model parameter of the channel, that is, a channel matrix model. The common pilot sequence may be inserted into information sent by a base station in an embodiment. In another embodiment, information to be sent may be divided into multiple small data blocks in advance, and multiple common pilot signals are inserted at intervals into the small blocks.

The channel estimation algorithm mentioned herein may be a least square channel estimation algorithm in an embodiment. The channel estimation algorithm may also be a maximum likelihood estimation algorithm in another embodiment, and may still be a minimum mean square error estimation algorithm or a maximum posterior estimation algorithm in still another embodiment.

After channel estimation, a channel matrix model between the user and the base station may be obtained, which is described in detail as follows.

It is assumed that channel estimation at a user side is complete. For example, the user has complete channel state information and path loss information. It is assumed that the number of transmit antennas of the base station is $N_t$, and the receiver of the user has $N_r$ receive antennas. By using channel estimation, a channel between the $n^{th}$ transmit antenna of the base station to the $m^{th}$ receive antenna of the user may be represented as $H_{mn}$, and can be modeled as:

$$H_{mn} = \sqrt{\frac{d_{mn}^{-\gamma}}{d_0}} H_{mn}^w \qquad (1)$$

where $d_{mn}$, is the distance from the $n^{th}$ transmit antenna of the base station to the $m^{th}$ receive antenna of the user, $d_0$ is a preset standard distance, $\gamma$ is a path loss factor, $d_{mn}^{-\gamma}$ represents path fading, $H_{mn}^w$ represents small scale Rayleigh fading, and $H_{mn}$ is a $n_R \times n_T$ dimension matrix. Further, in another embodiment, the user side may obtain path fading condition of a channel and small scale Rayleigh fading condition according to $d_{mn}^{-\gamma}$ and $H_{mn}^w$ parameters obtained in formula (1), and obtain channel state information such as a signal-to-noise ratio (SNR) from the fading condition.

In the communication system shown in FIG. 1, N base stations perform communication service for the $m^{th}$ user, and N herein changes with time. For the $m^{th}$ user, N channel matrices $H_{mn_1}$, $H_{mn_2}$, ... $H_{mn_N}$ are estimated, and all the matrices have a similar structure to that in formula (1). Therefore, a general channel matrix is generated.

$$H_m = [H_{mn_1} H_{mn_2} \ldots H_{mn_N}] \qquad (2)$$

Each element in the channel matrix in formula (2) is a small matrix, which is a channel matrix between each base station and the $m^{th}$ user, and also represents condition of all channels between each base station and the $m^{th}$ user, that is, condition of all channels between all antennas of the base station and all antennas of the user is included. In this way, in an embodiment, the user may obtain information such as path loss of each channel, a received signal-to-noise ratio, and a signal to noise and distortion by using channel estimation so that the channel quality of the channel is jointly deduced according to information of one or multiple kinds of information. It should also be understood that, in another embodiment, the quality of the channel may also be obtained through measurement, for example, information such as the path loss of each channel, the received signal-to-noise ratio, and the signal to noise and distortion may be obtained through measurement. Then the channel quality of the channel is obtained through joint calculation or deduction.

S404: Perform eigenvalue decomposition on the product of the channel matrix and conjugate transposition of the channel matrix to obtain a detection vector.

Specifically, it is assumed that in S403, channel estimation is performed according to the common pilot sequence, and the obtained channel matrix is H. In an embodiment, matrix multiplication operation may be performed on the channel matrix H and a conjugate transposition matrix of the channel matrix to obtain a product matrix $HH^H$. Eigenvalue decomposition is performed on the product matrix $HH^H$, and a first eigenvalue vector (an eigenvalue vector corresponding to a greatest eigenvalue) is selected as the detection vector. In another embodiment, eigenvalue decomposition may be performed on the product matrix $HH^H$, orthogonal conversion may be performed on an eigenvalue vector corresponding to the greatest eigenvalue (an eigenvalue vector corresponding to a greatest eigenvalue) after eigenvalue decomposition is performed on $HH^H$ to obtain an orthogonal eigenvalue vector, and the orthogonal eigenvalue vector is selected as the detection vector.

S405: Demodulate the service data containing multi-user interference by using the detection vector to obtain service data of the user.

In an embodiment, a calculation method of service data r of the paired user 1 is $r=\omega^H y$, where $\omega$ is a detection vector, $\omega^H$ represents conjugate transposition of $\omega$, y is user data containing multi-user interference and noise, and y may be represented as: $y=H_1 w_1 s_1 + +n_1+n_2$, where $H_1$ is a channel matrix of user 1, $\omega_1$ is a precoding vector, $s_1$ is service data of user 1, and $n_1$ and $n_2$ are the multi-user interference and the noise, respectively.

In Embodiment 2 of the present invention, by using the foregoing technical solutions, channel estimation is performed by using a common pilot sequence based on the paired users to obtain a channel matrix. The same pilot sequence is used for each user in the paired users of a cell or a collaborative area, which is different from the technical solution in the prior art that a user-specific DM-RS is used and the pilots of different layers are required to be orthogonal. Therefore, the CoMP mode is better supported, and accuracy of channel estimation is improved. Further, the detection vector is obtained by performing singular value decomposition on the estimated channel matrix, and the data is demodulated by using the detection vector, thereby eliminating interference between multiple users and improving the signal to interference plus noise ratio.

Figure 5:
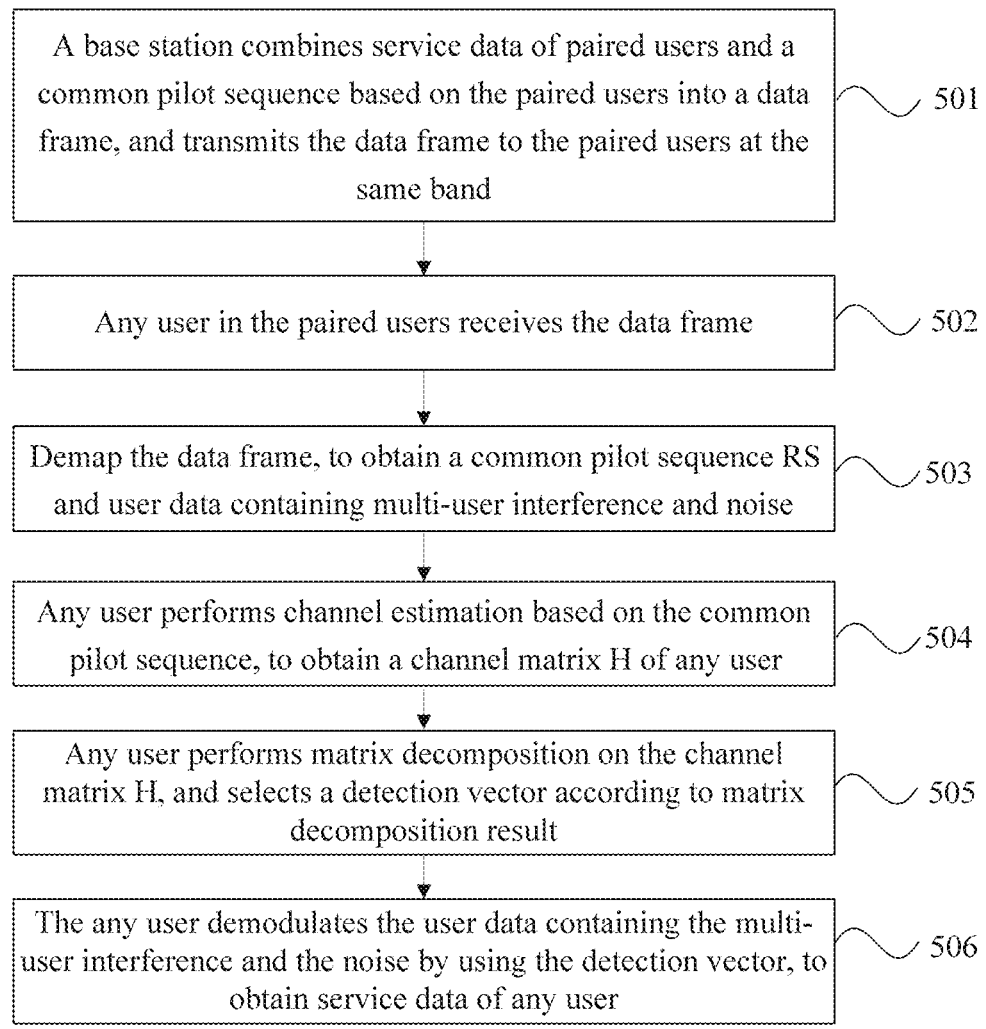
FIG. 5 is a flow chart of a multi-user interference suppression method according to Embodiment 3 of the present invention.

As shown in FIG. 5, Embodiment 3 of the present invention provides a multi-user interference suppression method, where the method is applied to a CoMP system shown in FIG. 1, or other communication systems, such as an LTE system. The method includes the following steps.

S501: A base station combines service data of paired users and a common pilot sequence based on the paired users into a data frame, and transmits the data frame to the paired users at the same band.

It should be noted that, in the MIMO system, each terminal only has one antenna, the difference between channel conditions of the users is great, and the difference of large-size fading in different antennas is large. By using a specific scheduling mechanism, users meeting a requirement are selected and grouped into one group so that successfully grouped user antennas form a virtual multi-antenna array and are receiving and sending data on the same time/frequency resource. The successfully grouped users are referred to as the paired users.

Figure 6:
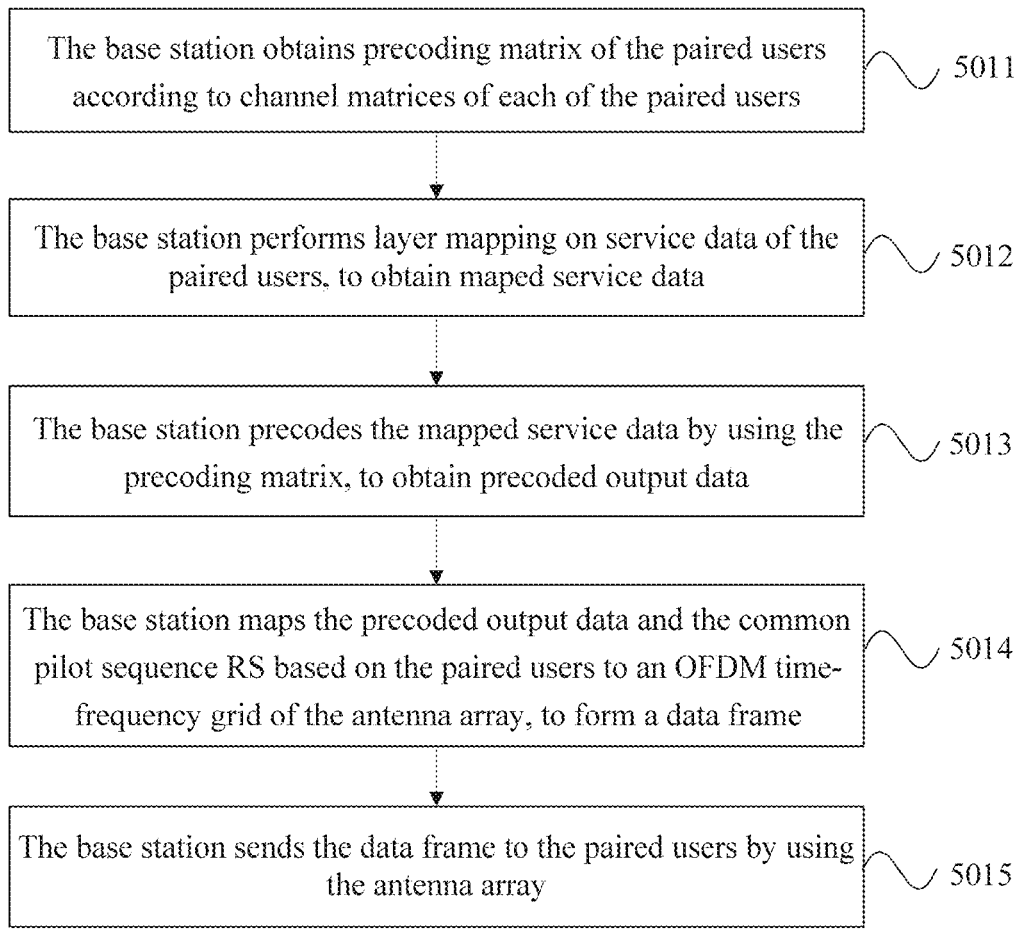
FIG. 6 is a flow chart of a multi-user interference suppression method according to Embodiment 3 of the present invention.

Specifically, as shown in FIG. 6, S501 specifically includes the following.

S5011: The base station obtains precoding matrix of the paired users according to a channel matrix of each user in the paired users.

It should be noted that, in the MIMO system, each terminal only has one antenna, the difference between channel conditions of the users is great, and the difference of large-size fading in different antennas is large. By using a specific scheduling mechanism, users meeting the requirement are selected and grouped into one group so that successfully grouped user antennas form a virtual multi-antenna array and are receiving and sending data on the same time/frequency resource. The successfully grouped users are referred to as the paired users.

Specifically, in an embodiment, it is assumed that a channel matrix of a paired user i (i=1,2, . . . n) is $H_i$, and singular value decomposition is performed on the channel matrix $H_i$ of each user to obtain a matrix $\tilde{V}=[v_1, v_2 \ldots v_n]$, where $v_i$ (i=1,2, . . . n) is a first right singular vector (which is usually a right singular vector corresponding to a greatest singular value) obtained after singular value decomposition is performed on a channel matrix $H_i=U_i \Sigma_i V_i^H$. It should be noted that any m×n complex matrix H may be decomposed into a product of three matrices U, Σ, V, where matrix U is an m×m dimension unitary matrix, V is an n×n dimension unitary matrix, and Σ is a diagonal matrix. An element on its diagonal is a number larger than or equal to 0, and elements in Σ are usually sorted in a descending order. A column vector of the matrix U is usually referred to as a left singular vector of H, and a first column of the matrix U is usually referred to as a first left singular vector. Column vectors of the matrix U and the matrix V are usually referred to as the right singular vector of H.

Afterwards, a right pseudo-inverse is sought according to a formula $W=\tilde{V}[\tilde{V}^H \tilde{V}]^{-1}$ for $\tilde{V}$ to obtain a precoding matrix W, where $\tilde{V}^H$ represents conjugate transposition of $\tilde{V}$, $W=[W_1, W_2, \ldots W_n]$, and $W_i$ (i=1,2, . . . n) is a precoding vector of a user i.

S5012: The base station performs layer mapping on the service data of the paired users, to obtain mapped service data.

It should be noted that, according to the definition in the 3GPP standard draft R10, layer mapping is an operation of mapping modulated code words to corresponding layers according to the number of layers allocated by the MAC. After the operation of layer mapping, the original serial data stream is divided into multiple layers spatially, and the number of layers is usually smaller than or equal to a rank of channel matrix.

S5013: The base station precodes the mapped service data by using the precoding matrix, to obtain precoded output data.

In an embodiment, it is assumed that after layer mapping is performed on the service data of the paired users, the obtained layered service data is represented as $s=[s_1, s_2 \ldots s_n]$, and the layered service data is precoded to obtain precoded output data, S=Ws.

S5014: The base station maps the precoded output data and the common pilot sequence RS based on the paired users to an OFDM time-frequency grid of the antenna array to form a data frame.

It should be noted that, in the embodiment of the present invention, the common pilot sequence based on the paired users refers to that the same pilot sequence is used for all the paired users in a cell or a collaborative area, which is different from the DM-RS in the technical solution in the prior art, where the DM-RS is specified by the user, that is, each UE has a corresponding DM-RS.

It should also be noted that, the antenna mapping function is mainly completed in S305; and according to the definition in the standard, antenna mapping is to map data transmitted in each antenna to an OFDM time-frequency grid of the antenna array according to the time-frequency resource configured by the MAC.

S5015: The base station sends the data frame to the paired users by using the antenna array.

S502: Any user in the paired users receives the data frame.

S503: Demap the data frame to obtain a common pilot sequence RS and user data containing multi-user interference and noise.

Antenna mapping is performed on baseband data before it is sent by using the antenna array, and therefore, after receiving baseband data, the user needs to perform demapping, where demapping is an inverse process of antenna mapping. In addition, the data experiences a transmission process of a wireless channel in the CoMP system, and multi-user interference and noise are sure to be caused. Therefore, the received baseband data is demapped, and the obtained service data contains multi-user interference and noise.

S504: Any user performs channel estimation based on the common pilot sequence to obtain a channel matrix H of any user.

S505: Any user performs matrix decomposition on the channel matrix H, and selects a detection vector according to a matrix decomposition result.

In an embodiment, a first left singular vector (or a left singular vector corresponding to a greatest singular value) obtained after singular value decomposition is performed on the channel matrix is used as the detection vector.

In another embodiment, orthogonal conversion is performed on the first left singular vector (or a left singular vector corresponding to a greatest singular value) obtained after singular value decomposition is performed on the channel matrix H to obtain a new vector, and the new vector is used as the detection vector.

In another embodiment, eigenvalue decomposition is performed on the obtained estimation channel matrix H, and a first eigenvalue vector (or an eigenvalue vector corresponding to the greatest eigenvalue) is used as the detection vector.

In another embodiment, orthogonal conversion may be performed on a first eigenvalue vector obtained after eigenvalue decomposition is performed on the channel matrix H to obtain a new vector, and the new vector is used as the detection vector.

S506. Any user demodulates the user data containing the multi-user interference and the noise by using the detection vector to obtain service data of any user.

In an embodiment, a calculation method of service data r of the paired user 1 is $r=\omega^H y$, where $\omega$ is a detection vector, $\omega^H$ represents conjugate transposition of $\omega$, y is user data containing multi-user interference and noise, and y may be represented as: $y=H_1 w_1 s_1 + + n_1 + n_2$, where $H_1$ is a channel matrix of user 1, $w_1$ is a precoding vector, $s_1$ is service data of user 1, and $n_1$ and $n_2$ are the multi-user interference and the noise, respectively.

In Embodiment 3 of the present invention, by using the foregoing technical solutions having a common pilot sequence based on the paired users, the same pilot sequence is used for each user in the paired users of a cell or a collaborative area, which is different from the technical solution in the prior art where a user-specific DM-RS is used and the pilots of different layers are required to be orthogonal. Therefore, the CoMP mode is better supported, and accuracy of channel estimation is improved. Correspondingly, at a receiver, the detection vector is obtained based on channel estimation to reduce interference between multiple users and improve the signal to interference plus noise ratio.

Figure 7:
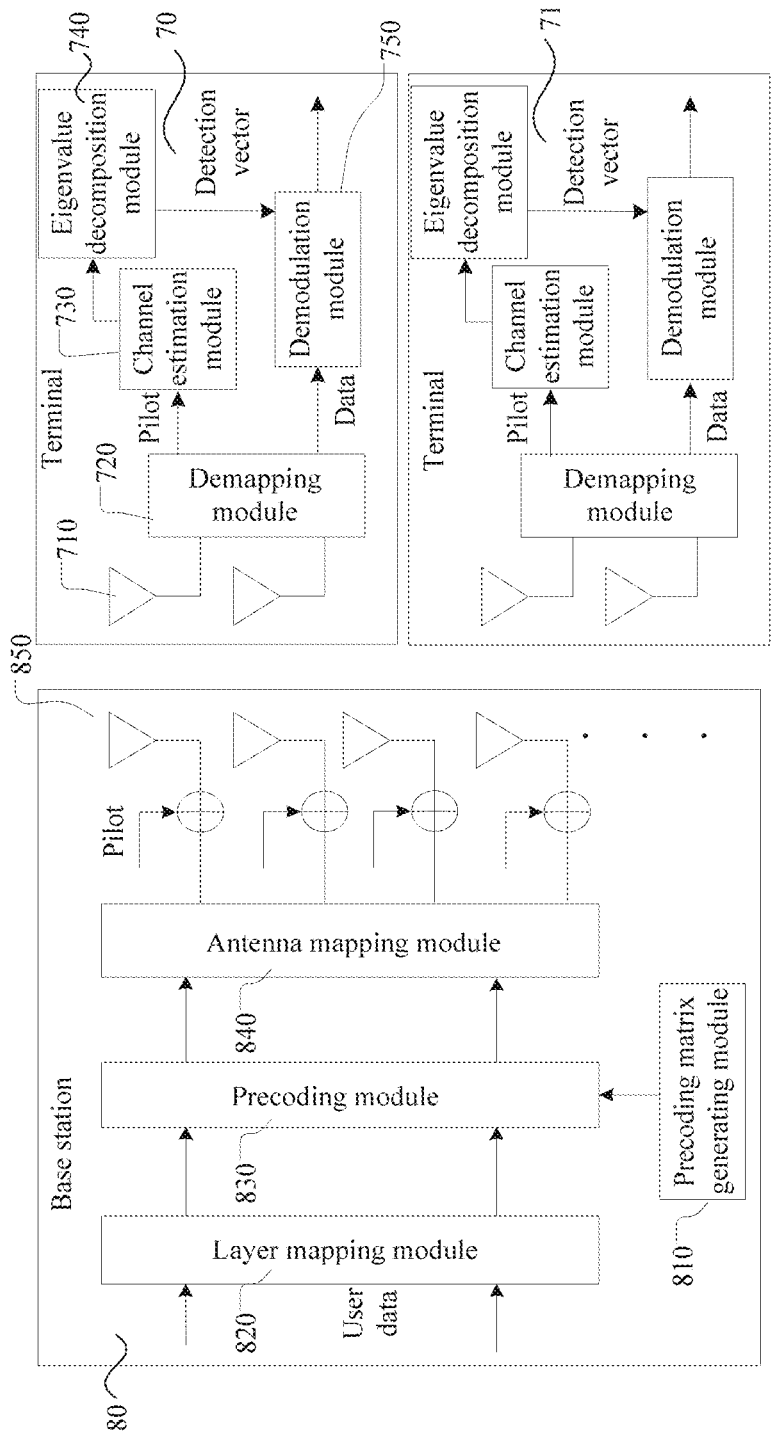
FIG. 7 is a schematic diagram of a MU-MIMO communication system based on non-codebook precoding according to Embodiment 4 of the present invention.

As shown in FIG. 7, Embodiment 4 of the present invention provides a MU-MIMO communication system based on non-codebook precoding. FIG. 7 is a structural diagram of an MU-MIMO system according to an embodiment of the present invention. It is assumed that the number of transmit antennas of the base station is $N_t$, the receiver of the user has $N_r$ receive antennas, and the number of users participated in the pairing is n (n≥2). In the embodiment of the present invention, two paired users (70 and 71 in FIG. 7) are taken as an example for illustration. As shown in FIG. 7, the system includes at least a base station 80 and at least two terminals 70, 71.

The base station 80 is configured to combine the common pilot sequence and non-codebook precoding data based on the paired users (70 and 71 shown in FIG. 7) into a data frame, and transmit the foregoing data frame to the at least two terminals simultaneously at the same band. The common pilot sequence based on the paired users refers to that the same pilot sequence is used for all the paired users in a cell or a collaborative area, which is different from DM-RS in the technical solution in the prior art where the DM-RS is specified by the user, that is, one UE has a corresponding DM-RS.

The terminal is configured to receive the data frame transmitted by the base station 80, perform channel estimation based on the common pilot sequence in the data frame to obtain an estimation channel matrix, perform matrix decomposition on the estimation channel matrix, select a detection vector according to a matrix decomposition result, and perform data demodulation by using the detection vector.

Referring to FIG. 7, in the communication system according to Embodiment 4 of the present invention, the base station 80 mainly includes a precoding matrix generating module 810, a layer mapping module 820, a precoding module 830, a modulation mapping module 840, and an antenna array 850.

The precoding matrix generating module 810 is configured to obtain precoding matrix of the paired users according to the channel matrices of the paired users.

In an embodiment, the precoding matrix generating module 810 specifically includes a matrix decomposition unit configured to perform singular value decomposition on a channel matrix of each user in the paired users to obtain singular vectors $v_1, v_2 \ldots v_n$ corresponding to each user, where the singular vector $v_i$ is a right singular vector corresponding to a greatest singular value obtained by performing singular value decomposition on a channel matrix $H_i$ of a user i, and combine singular vectors corresponding to each user to obtain a matrix $\tilde{V}=[v_1, v_2 \ldots v_n]$. The matrix decomposition unit 8101 measures channels of the paired users, performs singular value decomposition on the channel matrix $H_i$ of each user to obtain a matrix $\tilde{V}=[v_1, v_2]$, where $v^i$ (i=1,2) is a first right singular vector (which usually is a right singular vector corresponding to a greatest singular value) obtained after singular value decomposition is performed on a channel matrix $H_i=U_i \Sigma_i V_i^H$. A matrix operation unit is configured to seek a right pseudo-inverse according to a formula $W=\tilde{V}[\tilde{V}^H \tilde{V}]^{-1}$ to obtain a precoding matrix W, where $\tilde{V}^H$ represents conjugate transposition of $\tilde{V}$, $W=[W_1, W_2, \ldots W_n]$, and $W_i$ (i=1,2, \ldots n) is a precoding vector of the user i.

The layer mapping module 820 is configured to perform layer mapping on service data of the paired users to obtain layered service data.

The precoding module 830 is configured to precode the layered service data by using the precoding matrix to obtain precoded output data.

Specifically, the precoding module 830 performs precoding operation on user data $s=[s_1, s_2 \ldots s_n]$ after layer mapping (which usually is PDSCH data) by using the precoding matrix W obtained by the precoding matrix generating module 810 to obtain precoding data S=Ws.

It should be noted that, under an MU-MIMO transmission mode of the CoMP system, each user may receive data streams of multiple antennas. In addition, at the same time, each user may independently receive different data streams, and each data stream may be spatially interfered by other data streams. The meaning of the other data streams is one is data streams sent to other users (multi-user interference may be caused), and the other is other data streams sent to the user (interference between cells may be caused). The precoding module 830 mainly eliminates or reduces interference of data streams sent to other users, that is, performs elimination preprocessing on multi-user interference.

Layer mapping and precoding processing is the same as the processing process in the prior art. Therefore, it is not repeated in the embodiment of the present invention further.

The antenna mapping module 840 is configured to map the precoded output data S and a common pilot sequence RS based on the paired users (70 and 71 in FIG. 7) to an OFDM time-frequency grid of the antenna array 850, and send them to the terminal by using the antenna array 850.

The terminal 70 mainly includes a receiving module 710, a demapping module 720, a channel estimation module 730, an eigenvalue decomposition module 740, and a demodulation module 750.

The receiving module 710 is configured to receive data sent by the antenna array 850 of the base station 80.

The demapping module 720 is configured to demap the received data to obtain the common pilot sequence RS and user data containing multi-user interference and noise, input the common pilot sequence RS into a channel estimation module 730, and input the user data containing the multi-user interference and the noise into the demodulation module 750.

Specifically, the terminal 70 is used as an example. The user data containing the multi-user interference and the noise obtained by the demapping module 720 may be represented as $y=H_1 w_1 s_1 ++n_1+n_2$, where $H_1$ is a channel matrix from the base station 80 to the terminal 70, $w_1$ is a precoding vector of the terminal 70, $s_1$ is user data of the terminal 70, and $n_1$ and $n_2$ are multi-user interference and noise, respectively.

The channel estimation module 730 performs channel estimation based on a common pilot sequence RS to obtain a channel matrix H between the terminal 70 and the base station 80.

It should be noted that, for a specific operating procedure of the channel estimation module 730, reference may be made to S403 in Embodiment 2 of the present invention, which is not repeated herein any further.

The eigenvalue decomposition module 740 is configured to perform eigenvalue decomposition on a product of the channel matrix H and conjugate transposition of H to obtain the detection vector.

Specifically, it is assumed that channel estimation module 730 performs channel estimation according to the common pilot sequence, where an obtained channel matrix is H. In an embodiment, the eigenvalue decomposition module 740 may specifically include a multiplication unit configured to perform matrix multiplication operation on the channel matrix H and a conjugate transposition matrix of the channel matrix to obtain a product matrix $HH^H$, a decomposition unit configured to perform eigenvalue decomposition on the product matrix $HH^H$, and a selection unit configured to select a first eigenvalue vector (an eigenvalue vector corresponding to a greatest eigenvalue) as the detection vector. In another embodiment, the eigenvalue decomposition module 740 may also perform eigenvalue decomposition on the product matrix $HH^H$, and perform orthogonal conversion on an eigenvalue vector corresponding to a greatest eigenvalue (an eigenvalue vector corresponding to the greatest eigenvalue) after eigenvalue decomposition is performed on $HH^H$ so as to obtain an orthogonal eigenvalue vector and select the orthogonal eigenvalue vector as the detection vector The demodulation module 750 demodulates user data containing the multi-user interference and the noise by using the detection vector ω to obtain service data of the terminal 70.

Specifically, the terminal 70 is taken as an example, and the calculation method for the user data r is $r=\omega^H y$, where ω is a detection vector, y is user data containing the multi-user interference and the noise obtained by the demapping module 720, and y may be represented as $y=H_1 w_1 s_1 ++n_1+n_2$, where $H_1$ is a channel matrix from the base station 80 to the terminal 70, $w_1$ is a precoding vector of the terminal 70, and $s_1$ is user data of the terminal 70, and $n_1$ and $n_2$ are multi-user interference and noise, respectively.

Figure 8:
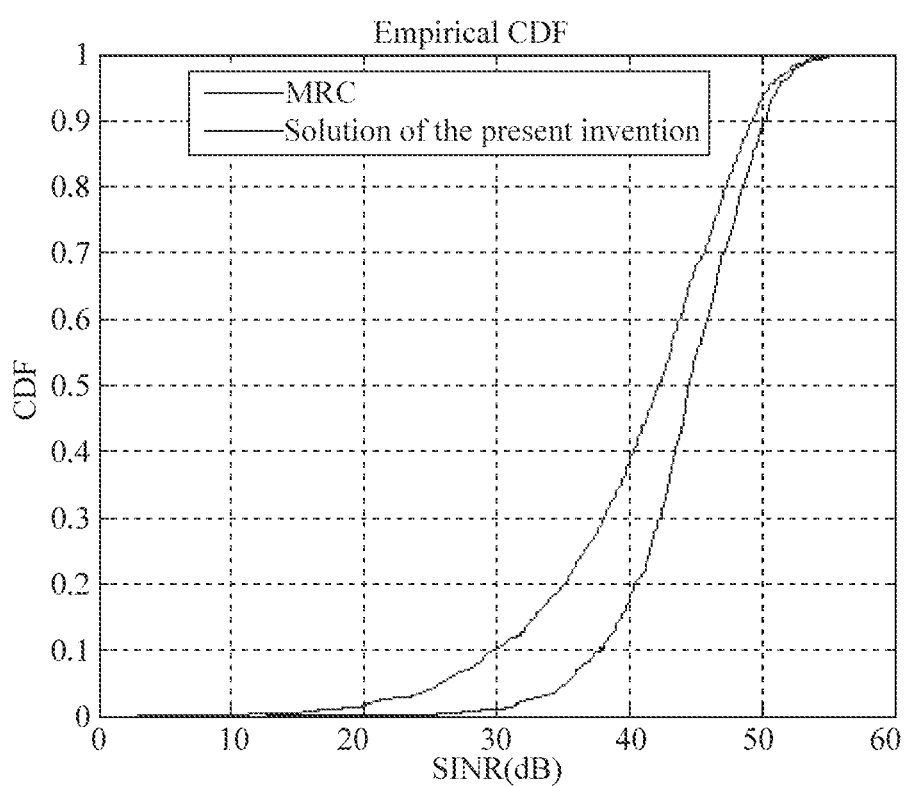
FIG. 8 is a curve chart of multi-user interference suppression method simulation verification of an embodiment of the present invention.

As shown in FIG. 8, an emulation result of a signal to interference plus noise ratio of receivers adopting the solutions in the present invention and adopting conventional maximum Ratio Combining (MRC). In the emulation process, two users are set to be paired, SNR=10 decibels (dB), interference to noise ratio (INR)=0 dB, and signal-to-interference-plus-noise ratio (SINR) distribution curves of receivers of 1000 transmission time intervals (TTIs) are given through the emulation. It can be seen from the emulation diagram that, after data sending and receiving solutions provided in the embodiment of the present invention are adopted, the signal to interference plus noise ratio of the receiver is obviously increased.

In Embodiment 4 of the present invention, by using the foregoing technical solutions having a common pilot sequence based on the paired users, the same pilot sequence is used for each user in the paired users of a cell or a collaborative area, which is different from the technical solution in the prior art where a user-specific DM-RS is used and the pilots of different layers are required to be orthogonal. Therefore, the CoMP mode is better supported and accuracy of channel estimation is improved. Correspondingly, at the receiver, the detection vector is obtained based on channel estimation so as to reduce interference between multiple users, and improve the signal to interference plus noise ratio.

Through the description of the foregoing embodiments, persons skilled in the art may clearly understand that the present invention may be implemented by using software plus a hardware platform, or all by using hardware, or a combination of the two. Based on such an understanding, the technical solutions of the present invention, or the part contributing to the prior art, may be implemented in the form of a software product. The software module or the computer software product may be stored in a storage medium, and includes several instructions for instructing a computer device (which may be a personal computer, a server, a network device or the like) to perform all or part of the steps of the methods provided in the embodiments of the present invention. The software program may be a random access memory (RAM), a memory, a read-only memory (ROM), an electrically programmable ROM, an electrically erasable programmable ROM, a register, a hard disk, a removable magnetic disk, a compact disk read-only memory (CD-ROM), or a storage medium of any other form well-known in the technical field.

Finally, it should be noted that the foregoing embodiments are merely intended for describing the technical solutions of the present invention rather than limiting the present invention. Although the present invention is described in detail with reference to the foregoing embodiments, persons of ordinary skill in the art should understand that they may still make modifications to the technical solutions described in the foregoing embodiments, or make equivalent replacements to part of the technical features thereof, as long as such modifications or replacements do not cause the essence of corresponding technical solutions to depart from the scope of the technical solutions of the embodiments of the present invention.

What is claimed is:

1. A data sending method, comprising:
obtaining, according to a channel matrix of each of paired users, a precoding matrix of the paired users, wherein the paired users are a set of multiple users sharing the same time-frequency resource and receiving and sending data on the same time-frequency resource simultaneously;
performing layer mapping on service data of the paired users to obtain layered service data;
precoding the layered service data by using the precoding matrix to obtain precoded output data;
mapping the precoded output data and a common pilot sequence to a port of an antenna array, wherein the common pilot sequence is the same pilot signal sequence sent by a base station on a specific time-frequency resource to each user in the paired users; and
sending the data mapped to the port of the antenna array to each user by using the antenna array.

2. The data sending method according to claim 1, wherein the obtaining the precoding matrix of the paired users comprises:
performing singular value decomposition on the channel matrix of each user in the paired users, to obtain singular vectors $v_1, v_2 \ldots v_n$ corresponding to each user, wherein the singular vector $v_i$ is a right singular vector corresponding to a greatest singular value obtained by performing singular value decomposition on a channel matrix $H_i$ of a user i, and combining singular vectors corresponding to each user, to obtain a matrix $\tilde{V}=[v_1, v_2 \ldots v_n]$; and
seeking a right pseudo-inverse for $\tilde{V}$ according to a formula $W=\tilde{V}[\tilde{V}^H \tilde{V}]^{-1}$ to obtain a precoding matrix W, wherein $\tilde{V}^H$ represents conjugate transposition of $\tilde{V}$, $W=[W_1, W_2, \ldots W_n]$, and $W_i$ (i=1, 2, \ldots n) is a precoding vector of a user i.

3. A data receiving method, comprising:
receiving, by a user, data sent by a base station;
demapping, by the user, the received data to obtain a common pilot sequence and service data containing multi-user interference, wherein the common pilot sequence is the same pilot signal sequence sent by the base station on a specific time-frequency resource to the user and other users receiving and sending data on the same time-frequency resource as the user, and wherein reference signals of the user and other users are not orthogonal;
performing, by the user, channel estimation by using the common pilot sequence to obtain a channel matrix between the user and the base station;
performing eigenvalue decomposition on the product of the channel matrix and a conjugate transposition of the channel matrix to obtain a detection vector; and
demodulating the service data containing multi-user interference by using the detection vector, to obtain service data of the user.

4. The data receiving method according to claim 3, wherein the performing eigenvalue decomposition on the product of the channel matrix and conjugate transposition of the channel matrix to obtain a detection vector comprises:
performing matrix multiplication operation on the channel matrix and the conjugate transposition of the channel matrix to obtain a product matrix;
performing eigenvalue decomposition on the product matrix; and
selecting an eigenvalue vector corresponding to a greatest eigenvalue as the detection vector.

5. The data receiving method according to claim 3, wherein the performing eigenvalue decomposition on the product of the channel matrix and conjugate transposition of the channel matrix to obtain a detection vector comprises:
performing matrix multiplication operation on the channel matrix and the conjugate transposition of the channel matrix to obtain a product matrix;
performing eigenvalue decomposition on the product matrix;
performing orthogonal conversion on an eigenvalue vector corresponding to a greatest eigenvalue after performing eigenvalue decomposition on the product matrix to obtain an orthogonal eigenvalue vector; and
selecting the orthogonal eigenvalue vector as the detection vector.

6. The data receiving method according to claim 3, wherein the demodulating the service data containing multi-user interference by using the detection vector to obtain service data of the user comprises multiplying the conjugate transposition of the detection vector by the service data containing multi-user interference to obtain the service data of the user.

7. A base station, comprising:
a memory:
a processor operably coupled to the memory and configured to:
obtain, according to a channel matrix of each of paired users, a precoding matrix of the paired users, wherein the paired users are a set of multiple users sharing the same time-frequency resource and receiving and sending data on the same time-frequency resource simultaneously;
perform layer mapping on service data of the paired users to obtain layered service data;
precode the layered service data by using the precoding matrix obtained by the precoding matrix generating module, to obtain precoded output data;
map the precoded output data and a common pilot sequence to a port of an antenna array, wherein the common pilot sequence is the same pilot signal sequence sent by a base station on a specific time-frequency resource to each user in the paired users; and
an antenna array configured to send the data mapped to the port of the antenna array to each user by using the antenna array.

8. The base station according to claim 7, wherein the processor is configured to:
perform singular value decomposition on the channel matrix of each user in the paired users to obtain singular vectors $v_1, v_2 \ldots v_n$ corresponding to each user, wherein the singular vector $v_i$ is a right singular vector corresponding to a greatest singular value obtained by performing singular value decomposition on a channel matrix $H_i$ of a user i, and combine singular vectors corresponding to each user, to obtain a matrix $v_1, v_2 \ldots v_n$; and seek a right pseudo-inverse for $\tilde{V}$ according to a formula $W=\tilde{V}[\tilde{V}^H \tilde{V}]^{-1}$ to obtain a precoding matrix W, wherein $\tilde{V}^H$ represents conjugate transposition of $\tilde{V}$, $W=[W_1, W_2, \ldots W_n]$, and $W_i$ (i=1, 2, ... n) is a precoding vector of a user i.

9. A terminal, comprising:

a memory; and a processor operably coupled to the memory and configured to:

receive data sent by a base station;

demap the received data to obtain a common pilot sequence and service data containing multi-user interference, wherein the common pilot sequence is the same pilot signal sequence sent by the base station on a specific time-frequency resource to the terminal and other terminals receiving and sending data on the same time-frequency resource as the terminal, and wherein reference signals of the terminal and other terminals are not orthogonal;

perform channel estimation by using the common pilot sequence to obtain a channel matrix between the terminal and the base station;

perform eigenvalue decomposition on the product of the channel matrix and conjugate transposition of the channel matrix to obtain a detection vector; and demodulate the service data containing multi-user interference by using the detection vector to obtain service data of the user.

10. The terminal according to claim 9, wherein the processor is configured to:

perform matrix multiplication operation on the channel matrix and the conjugate transposition of the channel matrix to obtain a product matrix;

perform eigenvalue decomposition on the product matrix; and select an eigenvalue vector corresponding to a greatest eigenvalue as the detection vector.

\* \* \* \* \*